No. 795,780. PATENTED JULY 25, 1905.
M. MILCH.
ALTERNATING CURRENT MOTOR.
APPLICATION FILED JAN. 2, 1904.

WITNESSES
INVENTOR.
MAURICE MILCH
BY
ATTORNEY.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

ALTERNATING-CURRENT MOTOR.

No. 795,780. Specification of Letters Patent. Patented July 25, 1905.

Application filed January 2, 1904. Serial No. 187,460.

*To all whom it may concern:*

Be it known that I, MAURICE MILCH, a subject of the Emperor of Austria-Hungary, residing at Schenectady, in the county of Schenectady and State of New York, have invented certain new and useful Improvements in Alternating-Current Motors, of which the following is a specification.

My invention relates to alternating-current motors of the repulsion type; and its object is to provide a motor which will operate with a better power factor than motors of this type heretofore constructed.

Another object of my invention is to provide means for the control and reversal of such motors, so as to enable them to be run in either direction with a high power factor at all times.

Figure 2:
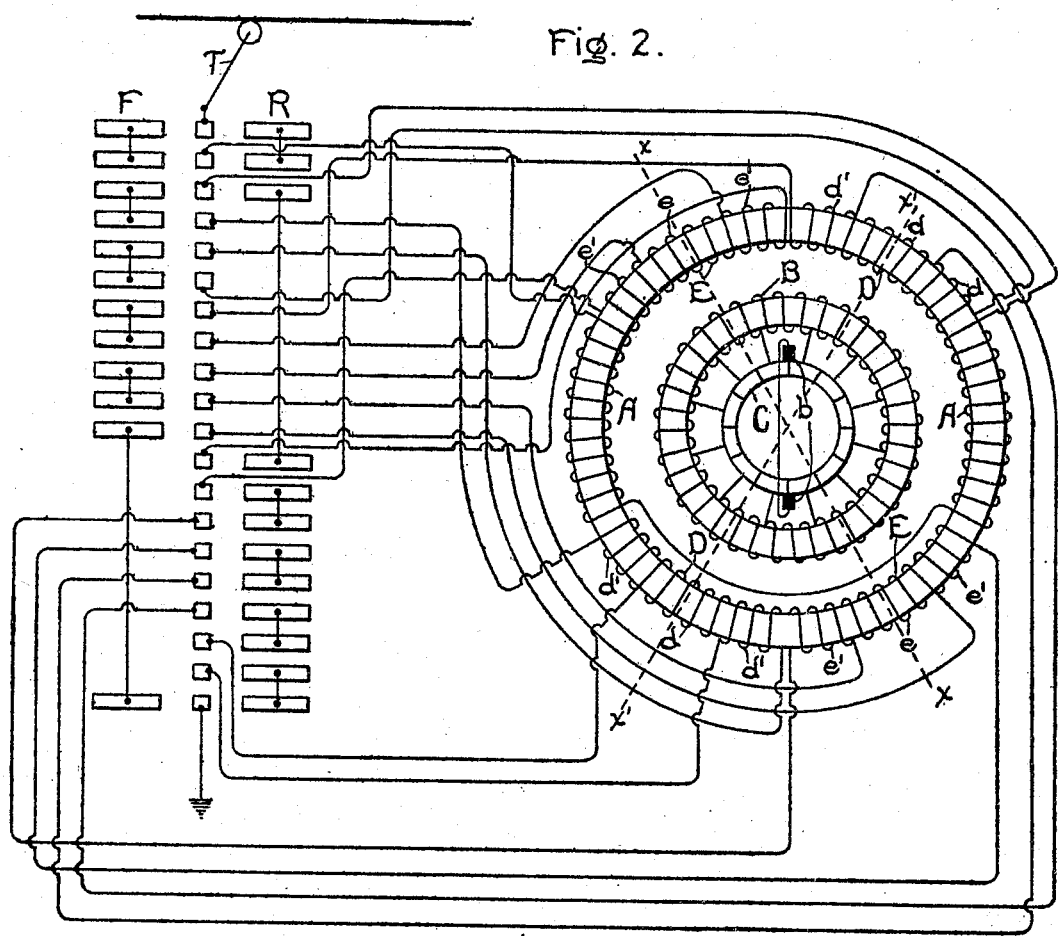
Figure 1:
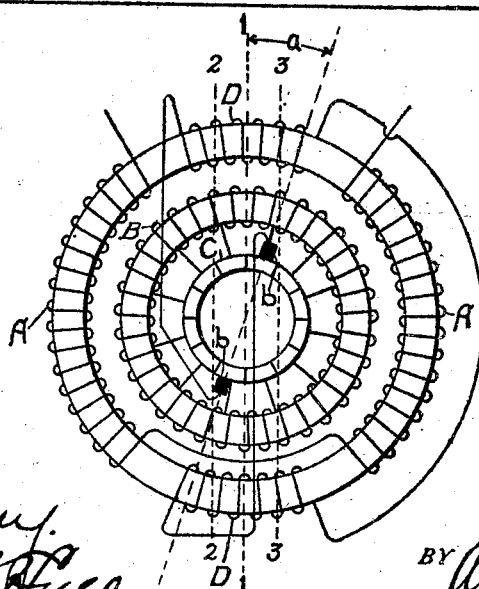

In the accompanying drawings, Figure 1 represents diagrammatically a motor constructed in accordance with my invention. Fig. 2 shows a modification of such a motor, together with an arrangement of switch contacts and circuits adapted to the control and reversal of the motor.

In Fig. 1, A A represent the main field-windings. B represents the rotor-winding supplied with a commutator C and brushes $b$ $b$ bearing thereon. Field-coils A A magnetize the motor along the line 1 1. Brushes $b$ $b$ are displaced from this line by the angle $a$. Current is induced in winding B by field-coils A A, which act as transformer primaries. The magnetization of the rotor produced by this induced current has its direction determined by the position of the brushes. The torque of the motor is due to the displacement of the brushes $b$ $b$ from the line 1 1 of the magnetization produced by the main field-coils A A. It is evident that only part of the rotor-winding B is active in generating the induced secondary rotor-current. The parts of rotor-winding B which are active in this transformer action are those which lie to the left and right of lines 2 2 and 3 3, respectively. The remaining part of the winding between the lines 2 2 and 3 3 is not active, as far as the transformer action is concerned, and it may, therefore, be termed the "idle" turns in distinction to those turns outside of lines 2 2 and 3 3, which are "active" transformer-turns. Although these parts or rotor-winding B are idle as regards transformer action, nevertheless they offer impedance to the flow of current induced in the active portion of the rotor-winding B. The effect of this impedance or self-induction is to produce a retardation of the current, and consequently to lower the power factor of both the rotor and the primary field currents. When the motor revolves, these idle turns cut the magnetic field produced by coils A A, and thus, although idle from the transformer standpoint, have an electromotive force induced in them by generator action. This electromotive force opposes the electromotive force of self-induction. Consequently if this electromotive force could be increased the electromotive force of self-induction could be partly compensated for. This generator electromotive force can be increased by increasing the number of turns between lines 2 2 and 3 3—that is, by shifting the brushes farther from the line of magnetization 1 1—but the generator electromotive force increases only directly with the number of turns, while the counter electromotive force increases with the square of the number of turns, and consequently simply shifting the brushes would diminish the power factor instead of increasing it. If, however, the self-induction can be kept at its original value, the brushes may be shifted so as to obtain the increased generator action, and thereby raise the power factor of the motor. I accomplish this by the use of the auxiliary field-coils D D. These coils are placed adjacent to part of the idle rotor-coils, and a current is supplied to them opposite in direction to that of the adjacent rotor-turns. By this means the same self-induction may be obtained with a large angular displacement of the brushes that would be possible only with a small angular displacement of the brushes with motors of this type as ordinarily constructed.

The current for energizing auxiliary coils D D should vary with the rotor-current and should be opposite thereto in direction. Therefore the best arrangement is to connect these coils in series either with the main coils A A or with the rotor-brushes $b$ $b$ directly or through a transformer. Thus in Fig. 1 the coils D D are shown connected in series with the rotor-brushes $b$ $b$, while in Fig. 2, as will be hereinafter explained, these coils are connected in series with the main coils A A.

The motor can be reversed and the high power factor maintained by shifting the brushes to the other side of the line of magnetization 1 1 and reversing the connection of auxiliary coils D D. For many purposes, however, as in cases where a plurality of motors must be controlled from a single point, reversal by shifting the brushes is not satisfactory. In Fig. 2 I have shown an arrangement whereby the motor may be reversed without shifting the brushes and yet maintain the high power factor. The stator of the motor is shown with a three-part winding having its parts arranged like the phases of a three-phase Gramme-ring winding, the three parts being represented, respectively, by A A, D D, and E E. Coils D D and E E are each divided into three parts $d'$ $d$ $d'$ and $e'$ $e$ $e'$. The motor-brushes $b$ $b$ are set on the line of magnetization that would be produced by coils A A alone. A controller is provided having two sets of contact-plates, one set (marked F) for the forward rotation of the motor and one set (marked R) for the reverse rotation. In the forward position of the controller coils D D are connected in series with coils A A, thus shifting the line of magnetization to the line $x$ $x$. Coils $e$ $e$ are also connected in series with the other field-coils in such a way that the current through these coils is in the opposite direction to that in the adjacent rotor-turns. Thus coils $e$ $e$ act as compensating coils in the manner that has already been described. Coils $e'$ $e'$ are left open-circuited. To reverse the direction of the motor, the whole of coils E E are connected in series with coils A A, while coils $d$ $d$ are also connected in series therewith and act as compensating coils, while coils $d'$ $d'$ are left open-circuited. Thus by a single movement of the controller the motor may be started in either direction and the self-induction of the idle rotor-turns compensated for.

In the drawings the motors have been shown as bipolar machines, with Gramme windings on both stator and rotor. It will be understood that my invention is in no way limited to this particular form of motor, since a motor with any number of poles and with any well-known form of winding may be built in accordance with my invention. Accordingly I do not desire to limit myself to the particular construction and arrangement of parts here shown, since changes therein which do not depart from the spirit of my invention and which are within the scope of the appended claims will be obvious to those skilled in the art.

I do not herein claim the method of reversing the rotation of a repulsion-motor by shifting the line of its primary magnetization, since such a method of reversal forms the subject of a separate application, Serial No. 164,929, filed by me July 10, 1903.

What I claim as new, and desire to secure by Letters Patent of the United States, is—

1. In an alternating-current motor, main field-coils, a rotor-winding supplied with a commutator, brushes bearing on said commutator and displaced from the line of magnetization produced by said main field-coils, and auxiliary compensating coils displaced from said main field-coils.

2. In an alternating-current motor, main field-coils, a rotor-winding supplied with a commutator, brushes bearing on said commutator and displaced from the line of magnetization produced by said main field-coils, and auxiliary compensating coils displaced from said main field-coils and energized by a current opposite in direction to the current in the adjacent rotor-turns and varying in magnitude therewith.

3. In an alternating-current motor, main field-coils, a rotor-winding supplied with a commutator, brushes bearing on said commutator and displaced from the line of magnetization produced by said main field-coils, and auxiliary compensating coils displaced from said main field-coils and connected in series therewith.

4. In an alternating-current motor, a rotor-winding having commutator and brushes, main field-coils adapted to magnetize said motor at an angle to the line of said brushes, and means for producing an electromotive force opposing the electromotive force of self-induction in that part of said rotor-winding which is not inductively situated with regard to the magnetization produced by said main coils.

5. In a repulsion-motor, auxiliary compensating coils displaced from the main field-coils and in series therewith.

6. In a repulsion-motor, auxiliary compensating coils in inductive relation to the rotor-turns which are in non-inductive relation to the main field.

7. In a repulsion-motor, auxiliary coils adapted to produce an electromotive force opposing the electromotive force of self-induction in that part of the rotor-winding which is in non-inductive relation to the main field.

8. In a repulsion-motor, means for producing a main field and an auxiliary compensating field, and means for shifting both fields in either direction.

9. In combination, a repulsion-motor having a three-part winding with the parts arranged like the phases of a three-phase winding, and means for connecting part of one phase in series with the other two phases.

10. In combination, a repulsion-motor having a three-part winding with the parts arranged like the phases of a three-phase winding, and means for connecting a part of either of two phases in series with the other two phases.

11. In combination, a repulsion-motor, means for shifting the magnetization of said motor, and means for producing an electromotive force opposing the electromotive force of self-induction in that part of the rotor-winding which is in non-inductive relation to said magnetization.

In witness whereof I have hereunto set my hand this 31st day of December, 1903.

MAURICE MILCH.

Witnesses:
BENJAMIN B. HULL,
MARGARET E. WOOLLEY.